Patented June 2, 1931

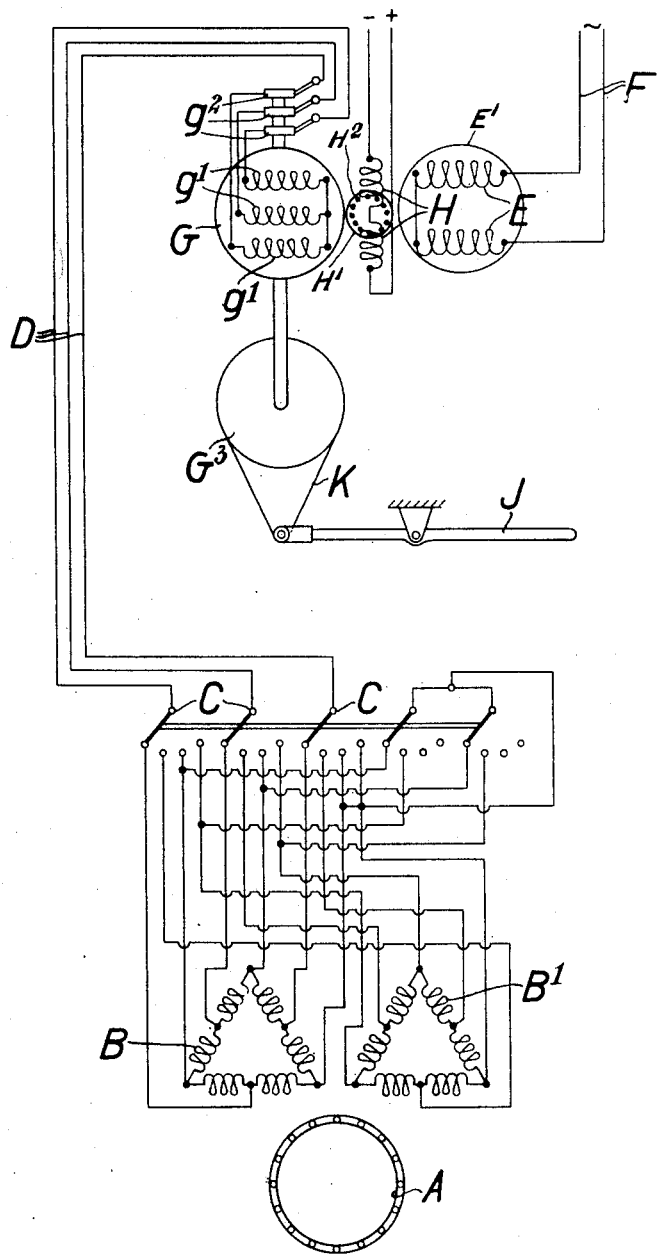

1,808,435

UNITED STATES PATENT OFFICE

FRANKLIN PUNGA, OF EBERSTADT, NEAR DARMSTADT, GERMANY, ASSIGNOR TO FRIED. KRUPP AKTIENGESELLSCHAFT, OF ESSEN-ON-THE-RUHR, GERMANY

CONTROLLING SYSTEM FOR POLYPHASE ALTERNATING CURRENT MOTORS

Application filed April 20, 1927, Serial No. 185,340, and in Germany May 10, 1926.

The invention relates to controlling systems for polyphase alternating current motors comprising a polyphase alternating current motor, a source of alternating current and a frequency-changer interposed between the motor and the source of alternating current and consists in using a frequency-changer formed by a primary element carrying a winding connected to the source of alternating current, a secondary element carrying a polyphase winding connected to said polyphase motor, one of said elements being rotatable relatively to the other, an auxiliary rotor concentrically arranged relatively to said primary and secondary element and carrying a short-circuited winding and an exciting one, and means interposed between the primary and secondary element for controlling at will the relative angular speed of said elements between zero and the speed of synchronism. The system specified affords the advantage that not only a starting current of any desired low frequency may be supplied to the polyphase motor but also the phase-displacement between the primary current and the tension may be compensated in a very simple manner.

In the accompanying drawing an example of realization of the device forming the subject-matter of the invention is diagrammatically illustrated, this device serving to operate three-phase induction motors which are connected to a single phase alternating current system through the intermediary of the above-mentioned frequency-changer acting in this case simultaneously as a phase transformer.

In this drawing A denotes the rotor, fitted with a short-circuit winding, of the three phase motor the stator of which is provided in known manner with two three phase windings B, B¹ wound for different pole numbers and adapted for star-delta change, so that the motor is capable of being changed over to four different speed steps. The terminals C of the three phase motor are in connection by means of a three phase wiring D with the frequency-changer consisting of a motor designed according to the patent application of Ludwig Schon and Wilhelm Leukert Serial No. 13,827, filed March 7, 1925, and which has matured into U. S. Patent No. 1,675,960. The stator or primary element E¹ of the motor carries a winding E connected to the single phase alternating current main F. The rotor or secondary element G of this motor is provided with a three phase winding $g^1$ connected to three slip rings $g^2$ to which either a starting resistance (not shown) or the three phase wiring D is connected, as shown in the drawing. Concentrically relatively to the rotor G and stator E¹ there is arranged between said two parts an auxiliary rotor H¹ carrying a short-circuited winding H² and an exciting winding H connected to a source of continuous current. The shaft of the rotor G has mounted on it a brake disk G³ embraced by a brake strap K to be operated by a hand lever J.

Before the three phase motor (A B B¹) is started, firstly the single phase motor E H G is started in known manner by gradually cutting off the starting resistance connected to the slip rings $g^2$, while the three phase wiring D is cut off from these rings and the brake J K G³ is released. After the rotor winding $g^1$ has been short-circuited, a three phase current flows therein, as the motor is without load, the frequency and voltage of which three phase current is approximately equal to zero. Now the three phase motor A B B¹ can thus be connected without danger to the slip rings $g^2$ of the single phase motor. After this has been done, the rotor G is gradually stopped by means of the brake J K G³. When this takes place, the voltage and frequency of the three phase current generated in the rotor winding $g^1$ and supplied through wiring D to the three phase motor gradually increase in the same measure as the speed of the rotor decreases, and the three phase motor starts under most favorable conditions owing to the frequency of the working current first being low. This starting operation takes place exactly as with synchronous motors fitted with short circuit rotor and started together with the appurtenant generator. The destruction of energy by the brake J K G³ taking place in the described starting operation corresponds exactly to the destruction of electric energy in the starting resistances which must be provided for otherwise for the three phase motor. The invention thus affords the further advantage that no starting resistances are required for the three phase motor and that its rotor can be constructed as a short-circuit rotor. Furthermore the advantage exists that owing to the qualities of the motor $E^1$, $H^1$, G used as frequency-changer the phase-displacement between the primary current and the tension may be compensated by the action of the exciting winding H in a very simple manner as is described in the above named patent application Serial No. 13,827. Besides, very favorable conditions are obtained in changing the motor over to a pole number corresponding to another speed step. When this change is to be executed, firstly the brake of the frequency-changer is loosened and then the changing-over of the motor or motors to the other pole number is executed. Assuming the rotor of the frequency-changer is still at rest in the first moment, now the full voltage and frequency would prevail at the terminals of the polyphase motor. A rush of current would thus occur which is determined by the difference between the lowermost and the next number of revolutions and by the leakage of the frequency-changer. The intensity of this rush of current will however not exert any noxious action due to the comparatively intense leakage of the frequency-changer, and is besides of very short duration, as only the main rotor of the phase transformer is accelerated and this up to a rate of revolutions $n$ which is given by the equation $$n = n_s \cdot \frac{v''-v'}{v''}$$

wherein:

$n_s$ is the synchronous rate of revolutions of the frequency-changer, and $v'$ and $v''$ are two subsequent speed steps of the locomotive.

The pasage from the one number of poles to the other can be executed of course without a rush by firstly accelerating the frequency-changer after the brake has been released. Generally it will satisfy to fit the three phase motors with two windings the pole connections of each of which are capable of being changed over. One may select for instance a six pole winding and an eight pole one, both adapted to be changed over in known manner in the proportion of 1:2, as illustrated in the drawing. Then the pole numbers 6, 8, 12 and 16 are obtained in all. Besides, any intermediate rate of revolutions can be obtained for a short time by applying the brake.

The great advantage of the described arrangement in comparison with known devices consists in the fact that now the three phase motors can be fitted with squirrel-cage rotors, in particular with those of a minimal resistance, whilst hitherto either wound rotors having a great number of slip rings, for instance eleven rings in the described embodiment, or squirrel-cage rotors of very great resistance must be used, as for instance in the Simplon locomotive, this further causing very high temperatures in the squirrel-cage rotors. In this latter case further the starting of the motor took place with rushes, whilst with my new arrangement the start can take place in any desired fine degree merely by regulating the pressure of the brake.

What I claim and desire to secure by Letters Patent, is:—

1. A controlling system for polyphase alternating current motors comprising a polyphase alternating current motor, a source of single phase alternating current and a frequency-changer interposed between the motor and the source of alternating current, said frequency-changer consisting of a primary element carrying a winding connected to said source of alternating current, a secondary element carrying a polyphase winding connected to said polyphase motor, one of said elements being rotatable relatively to the other, an auxiliary rotor concentrically arranged relatively to said primary and secondary element and carrying a short-circuited winding and an exciting one, and means interposed between the primary and secondary element for controlling at will the relative angular speed of said elements between zero and the speed of synchronism.

2. A controlling system according to claim 1 comprising a brake for controlling the relative angular speed of the primary and secondary element.

3. A controlling system according to claim 1 in which said polyphase alternating current motor is an induction motor having a rotor carrying a short-circuited winding.

The foregoing specification signed at Frankfort-on-the-Main, Germany, this 29th day of March, 1927.

FRANKLIN PUNGA.